United States Patent [19]
Fazio

[11] Patent Number: 6,127,490
[45] Date of Patent: Oct. 3, 2000

[54] VARNISH COMPOSITIONS, METHODS OF MAKING AND COMPONENTS MADE THEREFROM

[75] Inventor: Albert Chris Fazio, Lower Burrell, Pa.

[73] Assignee: Ranbar Electrical Materials, Inc., Manor, Pa.

[21] Appl. No.: 09/139,633

[22] Filed: Aug. 25, 1998

Related U.S. Application Data

[60] Provisional application No. 60/057,565, Aug. 26, 1997.

[51] Int. Cl.$^7$ .............................. C08F 20/00; C08F 20/40
[52] U.S. Cl. ..................... 525/438; 525/107; 525/165; 528/271; 528/392
[58] Field of Search ................................... 528/271, 392; 525/438, 107, 165

[56] References Cited

U.S. PATENT DOCUMENTS

| | | |
|---|---|---|
| 3,620,987 | 11/1971 | McLaughlin et al. . |
| 3,624,180 | 11/1971 | Schmid et al. . |
| 3,948,698 | 4/1976 | Elrick et al. . |
| 3,982,975 | 9/1976 | Elrick et al. . |
| 4,058,401 | 11/1977 | Crivello . |
| 4,120,923 | 10/1978 | Kloker et al. . |
| 4,138,255 | 2/1979 | Crivello . |
| 4,151,222 | 4/1979 | Hergenrother et al. . |
| 4,175,972 | 11/1979 | Crivello . |
| 4,237,250 | 12/1980 | Dieterich . |
| 4,298,707 | 11/1981 | Hergenrother et al. . |
| 4,299,932 | 11/1981 | Hergenrother et al. . |
| 4,316,967 | 2/1982 | Hergenrother et al. . |
| 4,337,103 | 6/1982 | Elrick et al. . |
| 4,343,885 | 8/1982 | Reardon, Jr. . |
| 4,349,651 | 9/1982 | Smith . |
| 4,467,072 | 8/1984 | Smith . |
| 4,703,338 | 10/1987 | Sagami et al. . |
| 4,966,928 | 10/1990 | Kitagawa et al. . |
| 4,990,597 | 2/1991 | Isegawa et al. . |
| 5,093,202 | 3/1992 | Mariaggi et al. . |
| 5,167,876 | 12/1992 | Lem et al. . |
| 5,276,073 | 1/1994 | Akutagawa et al. . |
| 5,362,835 | 11/1994 | Rolfe et al. . |
| 5,534,566 | 7/1996 | Wehner et al. . |
| 5,567,781 | 10/1996 | Martino et al. . |

FOREIGN PATENT DOCUMENTS

| | | |
|---|---|---|
| 0 094 650 | 11/1983 | European Pat. Off. . |

OTHER PUBLICATIONS

Patent Abstracts of Japan, vol. 005, No. 180 (C–079), Nov. 19, 1981 & JP 56 104918 A (Hitachi Chem Co Ltd), Aug. 21, 1981.

Chemical Abstracts, vol. 96, No. 2, Jan. 11, 1982, Columbus, Ohio, US; Abstract No. 7522, Hitachi: "Epoxy resin–unsaturated polyester blend adhesives" XP002084816 & JP 56 104918 A (Hitachi) Aug. 21, 1981.

*Primary Examiner*—Robert Dawson
*Assistant Examiner*—Jeffrey B. Robertson
*Attorney, Agent, or Firm*—Kirkpatrick & Lockhart LLP

[57] ABSTRACT

Apparatuses and methods are disclosed for the production of a polyester/epoxy copolymer that can be applied as a liquid to a surface prior to being cured. The method of preparing the polyester/epoxy copolymer includes mixing maleic acid with dicyclopentadiene to produce a ten-carbon double ring ester, promoting esterification with the addition of a source of hydroxyl, such as an alcohol or a glycol, to a desired acid number and reacting with an epoxy. Optionally, a source of unsaturation may also be added. Examples include excess maleic anhydride, fumaric acid, excess ten carbon ester, nadic anhydride, or tetrahydrophthalic acid. Electrical components of the present invention include a cured coating of the copolymer of the present invention over at least a portion of the component. Specific, selective modifications to 100% reactive polyester/epoxy copolymer electrical varnishes can result in greatly improved moisture and chemical resistance properties.

42 Claims, No Drawings

VARNISH COMPOSITIONS, METHODS OF MAKING AND COMPONENTS MADE THEREFROM

CROSS-REFERENCE TO RELATED APPLICATIONS

This application is a regular utility application being converted from provisional application, Serial No. 60/057,565 filed Aug. 26, 1997.

STATEMENT REGARDING FEDERALLY SPONSORED RESEARCH OR DEVELOPMENT

Not Applicable

BACKGROUND OF THE INVENTION

The present invention is directed generally to varnishes and, more particularly, to electrically insulating varnishes, methods of making such varnishes and electrical components produced therefrom.

Historically, polyester-based varnishes and epoxy-based varnishes have been the most commonly utilized materials in the area of insulating varnishes for electrical applications. Each of these systems comes to the marketplace with a distinctive set of properties which determines both the advantages and the limitations of the systems.

A myriad of formulations exists for both polyester and epoxy based insulating varnishes. Many formulation modifications to these systems have been successful in slightly improving specific targeted properties. However, none of the commercially available varnishes have been able to satisfy the desire for a "universal varnish", i.e., a varnish having the ideal properties of both epoxy and polyester systems and can be applied by a variety of methods (vacuum pressure impregnation (VPI), dip, trickle, etc.).

Polyester-based electrical varnishes have become very popular and are widely used because of their numerous desirable qualities. The desirable qualities of polyester-based systems include excellent electrical properties, low cost, good thermal endurance ratings, ideal flexibility and moderate bond strengths. However, polyester based varnishes do have weaknesses, which include low chemical and moisture resistance and a tendency toward a low film build.

Epoxy based electrical varnishes complement the desirable qualities of polyester varnishes, especially in the area of high chemical and moisture resistance, impact strength, and high bond strength. The weaknesses associated with epoxy varnishes include higher cost, shorter pot life for some catalyzed systems, lower thermal endurance ratings and less advantageous electrical properties.

In addition to pure polyester and epoxy varnishes, low level modified systems and polymer "blends" have been developed in the prior art with only limited success. Polymer blends usually retain to some extent the disadvantages of the polymer chemistry of the individual systems. Low level modifications generally offer slight improvements in targeted properties.

As a result of the weaknesses of prior art insulating varnishes, electrical components which are coated with the varnishes suffer from the same weaknesses.

In view of these and other shortcomings with prior art varnish compositions and electrical components employing the varnishes, there is a need for varnishes that provide electrical versatility for insulating electrical components.

BRIEF SUMMARY OF THE INVENTION

The above needs are addressed by methods practiced and apparatuses made in accordance with the present invention. The compositions of the present invention generally comprise a polyester/epoxy copolymer that can be applied as a liquid to a surface prior to being cured. Electrical components of the present invention include a cured coating of the copolymer of the present invention over at least a portion of the component.

The polyester/epoxy copolymer of the present invention is made by a method comprising reacting maleic acid with dicyclopentadiene at a temperature up to about 150° C. and for a period of time sufficient to produce a ten carbon ester, reacting with the ester a source of hydroxyl and allowing the reaction to proceed for a period of time sufficient to reach a desired acid number. When the desired acid number is reached, an epoxy resin is added and the reactants are maintained at a temperature of about 140° C. to produce a polyester/epoxy copolymer. The reaction continues until the desired acid number and viscosity is achieved.

Maleic acid may be prepared initially by reacting maleic anhydride with water. The method may further comprise adding a source of unsaturation when the source of hydroxyl is added. Alternatively, excess maleic acid may be added initially and will function as the source of unsaturation to promote esterification. A cross-linking agent may also be added following formation of the copolymer. Inhibitors in the form of free radical scavengers are preferably used at any stage of the method to inhibit gelation of the mixture. Examples include hydroquinone, benzoquinone, toluene hydroquinone, hydroquinone monomethylether, phenolic hydroxyl containing compounds or any free radical scavenger known to those skilled in the art for preventing or inhibiting gelation.

The source of hydroxyl may be any alcohol, such as a normal glycol or may be selected from the group consisting of an alcohol, a glycol, methyl propanediol, 1,6 hexanediol, cyclohexane dimethanol and combinations thereof. The source of unsaturation may be selected from the group consisting of maleic acid, maleic anhydride, fumaric acid, methyl tetrahydro phthalic acid, tetrahydrophthalic acid, methyl nadic anhydride, nadic anhydride or excess ten carbon ester.

Optionally, an acid functional monomer may be mixed with the ten carbon ester. The acid functional monomer may be a monoacid or a diacid. It may be selected from the group consisting of adipic acids, fatty acids, dimer acids and stearic acid.

It has been discovered that specific, selective modifications to 100% reactive polyester/epoxy copolymer electrical varnishes can result in greatly improved moisture and chemical resistance properties. In addition, the copolymer compositions provide increased bond strengths without increased brittleness.

Varnishes formulated in the present invention appear to retain all the traditional advantages of polyester and epoxy varnishes, while adding performance enhancements that approach optimal property values attainable from the two individual constituent systems. Specifically, the copolymer products have excellent bond strength without brittleness, low shrinkage, excellent moisture and chemical resistance, high thermal endurance ratings, ideal electrical properties and very reasonable cost.

Accordingly, the compositions, methods and components of the present invention provide for versatile varnishes and electrical components for a wide variety of uses. The above advantages and others will become apparent from the following detailed description.

DETAILED DESCRIPTION OF THE INVENTION

The present invention will be described generally with reference to present preferred embodiments of the invention only for the purpose of providing examples of the invention and not for purposes of limiting the same.

The compositions of the present invention generally comprise a polyester/epoxy copolymer that can be applied as a liquid prior to being cured. Electrical components of the present invention include a coating of the copolymer of the present invention over at least a portion of the component. Components suitable for coating in whole or in part, as the case may be, with the copolymer of the present invention include, but are not limited to, stators, coils, wires, motors and any other electrical component conventionally protected with electrical varnishes or insulation.

In a preferred embodiment, the polyester constituent is produced by reacting maleic anhydride with water to produce maleic acid,

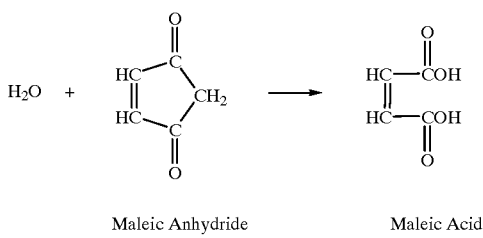

Maleic Anhydride    Maleic Acid and thereafter reacting maleic acid with dicyclopentadiene to produce an ester compound having the following ten carbon multiple ring structure.

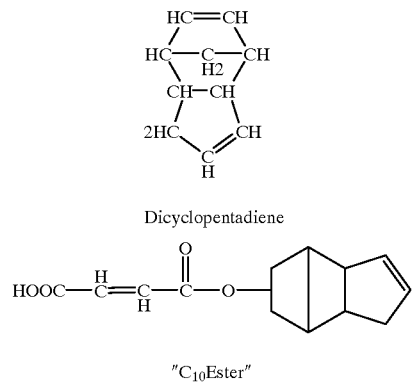

Dicyclopentadiene

"C₁₀Ester"

One skilled in the art will appreciate that maleic acid is commercially available through chemical suppliers such as, for example, Dow Chemical Company. Accordingly, the hydrolysis step described above can be eliminated when maleic acid is purchased rather than made. In that case, maleic acid is reacted with dicyclopentadiene in the first step of the method.

It is preferred that the polyester be as linear as possible in order to decrease the possibility of gelation during processing.

Further esterification is preferably promoted by the addition of a source of hydroxyl, such as an alcohol, a glycol, e.g. methyl propanedoil (MPD), 1, 6 hexarediol (HD) or cyclohexaredimethanol (CHDM). Any suitable alcohol or normal glycol known by those skilled in the art for use in promoting esterification will suffice.

Excess maleic anhydride in the hydrolysis reaction or excess maleic acid remaining after reacting with dicyclopentadiene will become esterfied with the addition of glycol. Triols and tetraols may be used as well, but pose increased risk of gelation unless particular attention is given to the stoichiometry. One skilled in the art will appreciate that one or more other sources of unsaturation may be added such as, for example, fumaric acid, tetrahydro phthalic acid, methyl tetrahydro phthalic acid, nadic anhydride, and methyl nadic anhydride, and mixtures thereof. Furthermore, any monofunctional alcohol group may be added with, or in partial replacement of, the glycol, but will lower the molecular weight of the product. Depending on the desired molecular weight of the final polyester/epoxy copolymer product, more or less alcohol may be added. However, some difunctionality is needed to react with the epoxy, and to provide sufficient molecular weight in the end product to obtain the desired properties so monofunctional alcohols preferably comprise only a minor amount of the esterification source.

In a preferred embodiment, methyl propanediol is added to the ten carbon ester as the source of hydroxyl and heated to about 160° to promote further esterification.

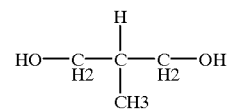

2-Methyl-1,3 Propanediol (MPD)

When the desired acid number is reached, preferably about 150 (as determined by removing and testing aliquots of the ester/MDP mixture periodically), the epoxy component is added.

The epoxy component of the copolymer is preferably difunctional and is comprised of a diglycidyl ether of Bisphenol A. The epoxy component may be various other epoxy resins such as, for example, Bisphenol F resins, Bisphenol S resins, and flexible epoxy resins such as, for example, a polyglycol type, epoxidized oils, polybutadiene, epoxy novalaks (high performance, high heat resistant resins), modified epoxies, and other rubber modified epoxies. Examples and structures of epoxy resins that may be used in the present invention are found in the Handbook of Epoxy Resins, H. Lee and K. Neville, McGraw Hill Book Co., 1967, pages 4–12, incorporated herein by reference. Examples of some preferred epoxy resins that are suitable for practice in the invention are Epon 828™ (liquid) and Epon 1001F™ (solid), both manufactured by Shell Chemical Co., DER 331™ manufactured by Dow Chemical Co. and other similar epoxy resins. Any suitable epoxy that will bind to the carboxyl group or hydroxyl group of the ester will suffice. The desired end product will dictate the precise nature of the epoxy component.

Acid functional monomers, including for example, adipic and similar difunctional acids, fatty acids, dimer acids and monofunctional acids, such as stearic acid, may optionally be added with the glycol esterification, or hydroxyl, source if increased flexibility in the end product is desired. However, the resulting product has a tacky surface, so addition of a drying agent is desirable. Colorants can also be added to the copolymer at this stage.

The polyester-epoxy copolymer can be diluted with a reactive diluent for use as a crosslinking agent when the copolymer is cured following application onto an electrical component. Suitable reactive diluents include vinyl toluene, styrene and/or diallyl phthalate (DAP). The copolymer may be cut with a solvent to facilitate application of the copolymer to a surface. Additionally, ethoxylated allyl alcohol may be used as the diluent for later use as the cross-linking agent when the copolymer is cured following application to an electrical component. Those skilled in the art will recognize that any unsaturated monomer may be added as the diluent.

A preferred copolymer structure appears generally as follows:

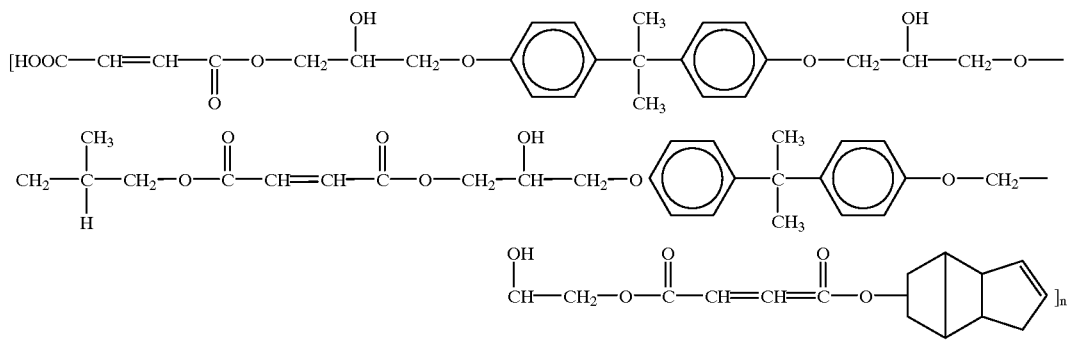

In a preferred embodiment, the ingredients are included in the following weight percentage:

| Ingredient | Weight % |
|---|---|
| Maleic Anhydride | 10–15 |
| $H_2O$ | 1–2 |
| 98% Dicyclopentadiene | 10–15 |
| Hydroquinone ($C_6H_4(OH)_2$) | 0.1–1 |
| Methyl propanediol | 5–10 |
| Epoxy Resin | 20–35 |
| P-Benzoquinone | 0.004–.1 |
| Vinyl Toluene | 35–45 | and the copolymer end product has following general properties:

| | |
|---|---|
| Color | Light Amber |
| Weight/Gallon | 8.9 Pounds |
| Brookfield Viscosity @ 25° C. | 700+/−100 cps |
| % Non-Volatile | 100% Reactive |
| Shelf Life (Catalyzed) | 3 Months @ 25° C. |
| Sunshine Gel Time @ 125° C. | 5–20 Minutes |
| Film Build | 1.5 Mils |
| Flash Point | 52.8° C. |

The amount of vinyl toluene added can be significantly lower if a high viscosity end product is desired. The more vinyl toluene added, the lower the viscosity.

Several samples having varying amounts of the ingredients of the present invention and various sources of esterification and epoxy resins were prepared. The ingredients in grams are as follows:

| Ingredient | in grams |
|---|---|
| Composition 1: | |
| Maleic Anhydride | 226 |
| $H_2O$ | 42 |
| Dicyclopentadiene | 270 |
| Hydroquinone (as inhibitor) | 0.75 |
| Methyl Propanediol | 297 |
| Adipic Acid | 292 |
| Epoxy resin, ER-510 | 872 |
| Hydroquinone (as inhibitor) | 0.5 |
| Vinyl Toluene (as diluent/cross-linking agent) | 1027 |
| Composition 2: | |
| Maleic Anhydride | 282 |
| $H_2O$ | 31 |
| Dicyclopentadiene | 232 |
| Methyl Propanediol | 207 |
| Hydroquinone (as inhibitor) | 0.5 |
| Tall Oil Fatty Acid (TOFA) | 497 |
| Epoxy resin, ER-510 | 811 |
| Hydroquinone (as inhibitor) | 0.5 |
| Vinyl Toluene (as diluent/cross-linking agent) | 866 |
| Composition 3: | |
| Maleic Anhydride | 368 |
| $H_2O$ | 41 |
| Dicyclopentadiene | 305 |
| Hydroquinone (as inhibitor) | 1.0 |
| Cylcohexanedimethanol (CHDM) | 432 |
| Epoxy resin, ER-510 | 846 |
| Hydroquinone (as inhibitor) | 2.0 |
| Vinyl Toluene (as diluent/cross-linking agent) | 1300 |
| Composition 4: | |
| Maleic Anhydride | 147 |
| $H_2O$ | 27 |
| Dicyclopentadiene | 203 |
| Maleic Anydride | 98 |
| Empol-1061 ™, a dimer acid | 285 |
| Methyl propanediol | 203 |
| Epoxy resin, ER-510 | 696 |
| Vinyl Toluene (as diluent/cross-linking agent) | 878 |
| Composition 5: | |
| Maleic anhydride | 441 |
| $H_2O$ | 49 |
| Dicyclopentadiene | 365 |
| Hydroquinone (as inhibitor) | 1.0 |
| Methyl propanediol | 284 |
| Bisphenol F epoxy resin, Epon-862 ™ (Shell Chemical Co.) | 868 |
| Hydroquinone (as inhibitor) | 2.0 |
| Vinyl toluene (as diluent/cross-linking agent) | 1062 |
| Composition 6: | |
| Maleic anhydride | 453 |
| $H_2O$ | 50 |
| Dicyclopentadiene | 376 |
| 1,6 hexanediol | 383 |
| Hydroquinone (as inhibitor) | 1.0 |
| Epoxy resin, ER-510 | 973 |
| Hydroquinone (as inhibitor) | 2.0 |

-continued

| Ingredient | in grams |
|---|---|
| Vinyl toluene (as diluent/cross-linking agent) | 1087 |
| Composition 7: | |
| Maleic anhydride | 441 |
| $H_2O$ | 49 |
| Dicyclopentadiene | 365 |
| Hydroquinone (as inhibitor) | 1.0 |
| Methyl propanediol | 285 |
| GE ™-23 (CVC Specialty Chemicals, Inc.), a flexible dipropylene glycol diglycidyl ether epoxy resin | 258 |
| Epoxy resin, ER-510 ™ | 693 |
| Hydroquinone (as inhibitor) | 2.0 |
| Vinyl toluene (as diluent/cross-linking agent) | 1105 |

Preparation of Polyester/Epoxy Copolomer

Compositions 2–7, were prepared generally as follows: the maleic anhydride, water and dicyclopentadiene were combined and stirred in a reaction vessel, or kettle, and heated to about 70° C. An exothermic reaction occurred, raising the temperature to about 150° C. The temperature was monitored with a standard temperature probe. The temperature was cooled and held to about 135° C. for about 45 minutes. The source of hydroxyl or both the source of hydroxyl and a source of unsaturation (e.g., a glycol alone or in combination with other unsaturation sources listed previously) were then added with stirring to form a mixture. A gelation inhibitor, hydroquinone, was added. The resulting mixture was heated to about 160° C. and held at that temperature until the acid number (AN) reached about 150, as determined by periodic removal and testing of small samples of the mixture by running a titration with KOH and testing with an acid base indicator. Any suitable known acid number testing method will suffice. When the acid number reached 150, the temperature was then cooled to about 140° C. The epoxy resin was added with stirring and maintained at about 140° C. An additional amount of inhibitor was added. The reaction was permitted to proceed until the desired acid number and viscosity was reached at which time the reaction was cooled to stop the polymerization. The copolymer product was diluted with a monomer diluent/cross-linking agent, vinyl toluene.

Styrene, ethoxylated allyl alcohol or DAP may also be used as the diluent/cross-linking agent. The diluent acts as a cross-linking agent when the catalyzed copolymer is applied to a surface and allowed to cure, either by heating or at room temperature. There are numerous commercially available catalysts used for curing varnishes and the like. Any suitable known catalyst for curing will suffice. The choice of catalyst depends on the temperature at which the curing process will occur. The catalyst is added immediately before curing if curing is at room temperature, but may be added to the copolymer at any time before curing, after the cross-linking agent is added. When peroxides are used as the catalyst, the diluted copolymer must be cooled to room temperature before the peroxide is added.

The epoxy to polyester polymerization reaction also can be catalyzed, if desired, but no catalyst is necessary.

One of ordinary skill in the art will appreciate that the amount of the monomer cross-linking agent may be adjusted depending on the final desired viscosity. For example, if high viscosity is desired, lower amounts of monomer cross-linking agent should be used, while higher amounts of monomer cross-linking agent should be used if low viscosity is desired.

The polyester/epoxy copolymer products of the present invention can be applied to electrical components by standard VPI, static dip and bake, trickle, or roll through techniques, well known to those skilled in the art. The low viscosity of these products ensures excellent varnish penetration into coil areas of electrical apparatus.

Testing of the polyester/epoxy copolymer was performed on a number of compositions to determine selected properties of the cured polymer. Two different compositions, designated #8 and #9 were prepared using a solid (Epon 1001F™) and a liquid (Epon 828™) epoxy resin, respectively, to investigate the effect of the resin on the properties having the composition:

| Ingredient | #8 Weight % | #9 Weight % |
|---|---|---|
| Maleic Anhydride | 12.52 | 13.71 |
| $H_2O$ | 1.72 | 1.55 |
| 98% Dicyclopentadiene | 12.90 | 11.85 |
| Hydroquinone $(C_6H_4(OH)_2)$ (as inhibitor) | 0.11 | 0.12 |
| Methyl propanediol | 7.24 | 7.89 |
| Epoxy Resin | 28.01 Epon 1001F | 26.3 Epon 828 |
| P-Benzoquinone $(C_6H_4(OH)_2)$ (as inhibitor) | 0.004 | 0.004 |
| Vinyl Toluene | 39.93 | 39.98 |
| Total | 39.934 | 39.984 |
| Weight Loss (due to waters of esterification) | −2.434 | −1.404 |
| | 100.00 | 100.00 |
| Density lbs./gal | 8.92 | 8.89 |

The compositions having the following general properties:

| Property\Composition | #8 | #9 |
|---|---|---|
| Flash Point ° C. | 60 | 60 |
| Viscosity, cps | 1000 | 700 |
| % Run-off | 2.1(2) | 0.0 (2) |
| Cure Time/Temp. | 1–2 hr @ 325–350° F. | 1–2 hr @ 325–350° F. |
| Film Build | 1.4 | 1.5 |

Chemical resistance testing was performed on MW-35 wires that had been coated with the compositions. The coated wires were cured at 165° C. and immersed in the respective chemicals listed in the table below for 168 hours. Following the immersion of the wires the bond strength was determined and composed to the pretest bond strength as shown below:

Chemical Resistance—As Determined By % Bond Strength Retention (168 Hours Immersion @ 2520 C.)

| Chemical\Composition | #8 | #9 |
|---|---|---|
| Methyl Ethyl Ketone (MEK) | 42.0 | 3.0 |
| 10% $H_2SO_4$ | 93.0 | 98.6 |
| ATF | 107.0 | 90.0 |
| H.D.10W/30 Oil | 101.9 | 101.4 |

-continued

| Chemical\Composition | #8 | #9 |
|---|---|---|
| 3% Salt Water | 94.9 | 92.9 |
| 100% Relative Humidity | 94.6 | 909.0 |

Generally, the two epoxy resins resulted in compositions that have similar properties and maintain the pretest bond strength (i.e., 100%); except with respect to bond strength following exposure to MEK. This variation is an example of the specific tailoring of the precise composition that can be done for specific applications.

Additional testing was performed on composition #8 to examine the effect of cure time on bond strength. An MW-35 (as per National Electrical Manufacturers Association (NEMA) classifications) magnetic wire was coated with composition #8 and cured at a temperature of 165° C. The bond strength of the cured coating was tested at ambient and elevated temperatures; the results of which are presented below:

| BOND STRENGTH TESTS (lbs) FOR COMPOSITION #8 | | | | | | | | | |
|---|---|---|---|---|---|---|---|---|---|
| | AT 25° C. (77° F.) | | | AT 100° C. (212° F.) | | | AT 150° C. (302° F.) | | |
| Bake Time: | 2 hr | 4 hr | 8 hr | 2 hr | 4 hr | 8 hr | 2 hr | 4 hr | 8 hr |
| Trial 1 | 11 | 24.5 | 22.5 | 6.5 | 5 | 9.5 | 1 | 2.5 | 2 |
| Trial 2 | 13 | 20 | 25.5 | 5.5 | 5.5 | 10.5 | 1 | 2 | 3 |
| Trial 3 | 18.5 | 19.5 | 23.5 | 5 | 6.5 | 13.5 | 1.5 | 1.5 | 2.5 |
| Trial 4 | 21.5 | 19.5 | 21.5 | 6.5 | 7 | 9.5 | 2.5 | 2 | 4 |
| Trial 5 | 20 | 20.5 | 22 | 4.5 | 7.5 | 18.5 | 1 | 2 | 2.5 |
| Trial 6 | 18.5 | 21 | 21 | 1 | 7 | 10 | 1 | 4 | 2 |
| Trial 7 | 20 | 19 | 22.5 | 5 | 6 | 9.5 | 1 | 1.5 | 2 |
| Trial 8 | 19.5 | 18.5 | 20.5 | 3 | 6.5 | 10 | 1 | 2 | 1.5 |
| Trial 9 | 19 | 20 | 22.5 | 5.5 | 5.5 | 11 | 1 | 2 | 2 |
| Trial 10 | 18 | 19 | 22.5 | 5.5 | 7 | 11 | 1.5 | 2.5 | 2.5 |
| Ave. Dev. | 1.64 | 1.1 | 0.92 | 1.18 | 0.68 | 1.88 | 0.35 | 0.48 | 0.5 |
| Mean | 18.4 | 20.15 | 22.4 | 4.8 | 6.35 | 11.3 | 1.25 | 2.2 | 2.4 |

As can be seen, the copolymer varnish has excellent bond strength at both ambient and elevated temperatures when properly cured. It is significant that the cure times and temperatures for the coatings are improvements over many commercially available varnishes. For example, a one hour cure at 163° C. (325° F.) results in excellent bond strength development. For most applications of the polyester/epoxy copolymer of the present invention, a cure cycle of 2–4 hours at 150° C. to 165° C. would appear to be suitable.

Coatings corresponding two compositions #10 and #11 were prepared and comparative testing was performed. The two compositions used for the testing are provided below:

| | Composition | |
|---|---|---|
| Ingredient | #10 Parts by Weight(g) | #11 Parts by Weight(g) |
| Maleic Anhydride | 441 | 441 |
| $H_2O$ | 60.7 | 50 |
| 98% Dicyclopentadiene | 454 | 381 |
| Hydroquinone ($C_6H_4(OH)_2$) (as inhibitor) | 1 | 1 |
| Methyl propanediol | 255 | 254 |
| Epon 828 | 0 | 849 |
| Epon 1001F | 906 | 0 |
| Hydroquinone ($C_6H_4(OH)_2$) (as inhibitor) | 1 | 1 |
| Vinyl Toluene | 1406 | 1266 |

The compositions 10 and 11 were prepared in accordance with the following general procedure. Maleic anhydride, $H_2O$, 98% dicyclopentadiene and hydroquinone are added with stirring to a kettle to form a mixture. A low pressure $N_2$ blanket is established in the kettle and the mixture is stirred and heated to between 70° C. and 140° C., preferably at 135° C. for ~45 min. During this time, the maleic anhydride is hydrolyzed by the water to form maleic acid, which reacts with the dicyclopentadiene to form the $C_{10}$ ester.

Methyl propanediol is then added to the mixture, and the mixture is heated to and maintained at a temperature of 170° C. until an acid number (AN) of 120–130 is reached, as indicated by testing with a Bromothymol blue indicator. Samples are periodically removed for titration for AN testing. Esterification takes places during this period and the waters of esterification are removed from the kettle. The mixture is cooled to ~140° C. and the epoxy resin is added to the mixture and maintained at 140° C. until a desired acid number and viscosity for the mixture is achieved. Typical values for the acid number range from 15–25, while the viscosity is in the range of a "T" value on the Gardner Holt bubble viscosity scale.

Hydroquinone, or a similar compound such as p-benzoquinone, is added to inhibit, and preferably prevent gelation of the mixture.

Vinyl toluene, other crosslinking agents, and/or solvents are added along with a curing catalyst, such as a peroxide, to the mixture and the mixture is cooled, filtered, and packaged. One skilled in the art will appreciate that the crosslinking agents can be added either prior to packaging or prior to application of the coating to a surface.

The resulting compositions 10 and 11 had the following properties:

| | |
|---|---|
| Color | Light Amber |
| Weight/Gallon | 8.9 lbs. |
| Brookfield Viscosity @ 25° C. | 600–800 cps |
| % non volatile | 100% reactive |
| Shelf Life | 3 months @ 25° C. |
| Sunshine Gel Time @ 125° C. | 5–20 minutes |
| Film Build | 1.5 Mils |
| Flash Point | 60° C. |
| VOC | 1.0 lb/gal |

The polyester/epoxy copolymer compositions were compared to several conventional insulating varnishes to determine the suitability of the polyester/epoxy copolymer compositions for electrical insulation. The varnishes were applied to production stators and cured for 1 hr. at temperatures between 300° and 325° F. The stators were then exposed for 168 hrs. to 96% relative humidity @ 95° F. After 168 hrs. the insulation resistance was measured on each stators with the following results;

| Insulating Resin | Insulation Resistance |
|---|---|
| 100% Solids Epoxy | 25 megohms |
| Water Soluble Varnish | 2.2 megohms |
| Unsaturated Polyester A* | 1.4 megohms |
| Unsaturated Polyester B* | 21 megohms |
| Unsaturated Polyester C* | 42 megohms |
| 75% Solids Epoxy Copolymer | 6 megohms |
| 80% Solids Phenolic/Alkyd | 4.6 megohms |
| 75% Solids Modified Epoxy | 1.2 megohms |
| Composition #8 | 774 megohms |
| Composition #9 | 31.9 gigohms |

*commercially available polyester resins designated A, B and C herein for test purposes.

As can be seen, the resistance of the copolymers are substantially higher than other varnishes. Other typical properties of copolymers of the present invention are compared with typical polyester and epoxy varnishes as shown below:

Varnish Property Comparison Solventless Systems

| Property | Typical Polyester | Typical Epoxy | Polyester/ Epoxy Copolymer |
|---|---|---|---|
| Viscosity (cps) | 50–100 | 3000 | 700 |
| Gel Time (Sunshine @ 125° C.) minutes | 15–20 | 30 | 10 |
| Film Build (mils) | 1 | 0.5–1 | 1.5 |
| Shelf Life months @ 25° C. (Catalyzed) | 3 | 6 | 3 |
| Bond Strength lbs. @ 25° C. | 20 | 50 | 35 |
| Bond Strength lbs @ 150° C. | 2 | 6 | 6 |
| Hardness, Shore D 25° C. | 85 | 85 | 80 |
| % H$_2$O Absorb, 24 hr @ 25° C. | 0.3–0.6 | 0.1–0.2 | 0.04 |
| VOC, Pounds/Gallon | ~1.5 | <1 | ~1.5 |
| Dielectric Strength, Dry volts/mil | 2000 | 2500 | 2500 |
| Cure Cycle hrs @ 150–165° C. | 2–4. | 4–6. | 2 |
| Dissipation Factor @ 25° C. | 0.02 | 0.033 | 0.02 |
| Dielectric Constant @ 25° C. | 2–3 | 4.0 | 2–3 |
| Shrinkage | High | Low | Low |
| Sea Salt Spray | Poor | Good | Good to Excellent |
| Cleveland Conditioned Humidity | Poor | Good | Good to Excellent |

As can be seen, compositions of the present invention include many of the desirable properties from both the polyester and the epoxy based varnishes without many of the weaknesses. Specifically, the copolymer system gives moisture/humidity resistance comparable to or exceeding that of epoxy systems, but at a significantly lower cost base. The low shrinkage and good flexibility of the copolymer-based varnish system should enhance the mechanical strength performance of the electrical apparatus treated with the varnish. The low viscosity, high film build and rapid cure provide ideal processing properties across the wide range of varnish application methods. In addition, attainable bond strengths approach those of epoxy systems. In summary, the copolymer products have excellent bond strength without brittleness, low shrinkage, excellent moisture and chemical resistance, high thermal endurance ratings, ideal electrical properties and very reasonable cost.

The present invention contemplate various electrical components that include compositions of the present invention as a coating over at least a portion of the component surface. The electrical components of the present invention include but are not limited to stators, coils, wires, motors, etc.

Those of ordinary skill in the art will appreciate that a number of modifications and variations that can be made to specific aspects of the method and apparatus of the present invention without departing from the scope of the present invention. Such modifications and variations are intended to be covered by the foregoing specification and the following claims.

What is claimed is:

1. A method for making a polyester-epoxy copolymer comprising:

reacting maleic acid with dicyclopentadiene at a temperature up to about 150° C. and for a period of time sufficient to produce a ten carbon ester having the following structure

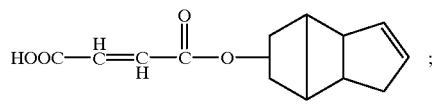

reacting with the ester a source of hydroxyl to produce a modified ester and allowing the reaction to proceed for a period of time sufficient to reach a desired acid number; and, reacting an epoxy compound with the modified ester for a period of time sufficient to produce a polyester/epoxy copolymer.

2. The method recited in claim 1 further comprising preparing maleic acid by reacting maleic anhydride with water prior to reacting maleic acid with dicyclopentadiene.

3. The method recited in claim 2 further comprising adding a source of unsaturation when the source of hydroxyl is added to promote esterification.

4. The method recited in claim 3 wherein the source of unsaturation is excess maleic anhydride.

5. The method recited in claim 1 wherein the source of hydroxyl is glycol.

6. The method recited in claim 1 wherein the source of hydroxyl is selected from the group consisting of an alcohol, a glycol, methyl propanediol, 1,6 hexanediol, cyclohexane dimethanol and combinations thereof.

7. The method recited in claim 1 further comprising adding a source of unsaturation when the source of hydroxyl is added to promote esterification..

8. The method recited in claim 7 wherein the source of unsaturation is selected from the group consisting of maleic acid, maleic anhydride, fumaric acid, methyl tetrahydro phthalic acid, tetrahydrophthalic acid, methyl nadic anhydride, nadic anhydride and excess ten carbon ester.

9. The method recited in claim 7 wherein excess maleic anhydride provides the source of unsaturation.

10. The method recited in claim 1 further comprising adding an inhibitor to inhibit gelation of the mixture.

11. The method recited in claim 10 wherein the inhibitor is a free radical scavenger.

12. The method recited in claim 10 wherein the inhibitor is selected from the group consisting of hydroquinone, benzoquinone, toluene hydroquinone, hydroquinone monomethylether, and phenolic hysdroxyl containing compounds.

13. The method recited in claim 1 further comprising diluting the polyester-epoxy copolymer with a monomer cross-linking agent.

14. The method recited in claim 13 wherein said cross-linking agent is selected from the group consisting of vinyl toluene, styrene, DAP and ethoxylated allyl alcohol.

15. The method recited in claim 1 further comprising mixing an acid functional monomer with the ten carbon ester when the source of hydroxyl is added.

16. The method recited in claim 15 wherein the acid functional monomer is a monoacid or a diacid.

17. The method recited in claim 15 wherein the acid functional monomer is selected from the group consisting of adipic acids, fatty acids, dimer acids and stearic acid.

18. The method recited in claim 1 wherein the epoxy compound is formed from one selected from the group consisting of Bisphenol A, Bisphenol F, Bisphenol S, polyglycol, epoxidized oils, polybutadiene, epoxy novalaks, modified epoxies, rubber modified epoxies and combinations thereof.

19. The method recited in claim 1 wherein the epoxy resin is a diglycidyl ether of Bisphenol A.

20. A polyester-epoxy copolymer composition comprising:

22. The copolymer recited in claim 21 wherein said monomer cross-linking agent is vinyl toluene added in an amount equal to about 35–45% by weight.

23. An apparatus comprised of an electrical component having a surface at least a portion of which is coated with a polyester-epoxy copolymer, said copolymer formed from the polymerization of an unsaturated polyester and an epoxy resin.

24. The apparatus recited in claim 23 wherein the polyester-epoxy copolymer comprises the composition of claim 20.

25. A copolymer composition comprised of an unsaturated polyester copolymerized with an epoxy resin.

26. A composition comprised of the following ingredients:

a ten carbon ester of the form:

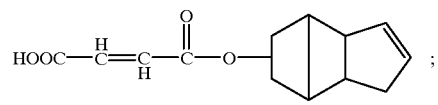

methylpropanediol; and, an epoxy resin copolymerized with said ten carbon ester and methylpropanediol.

27. The composition of claim 26 wherein said epoxy resin is a diglycidyl ether of a bisphenol A epoxy resin.

28. The composition of claim 26 further comprising maleic anhydride as one of the ingredients.

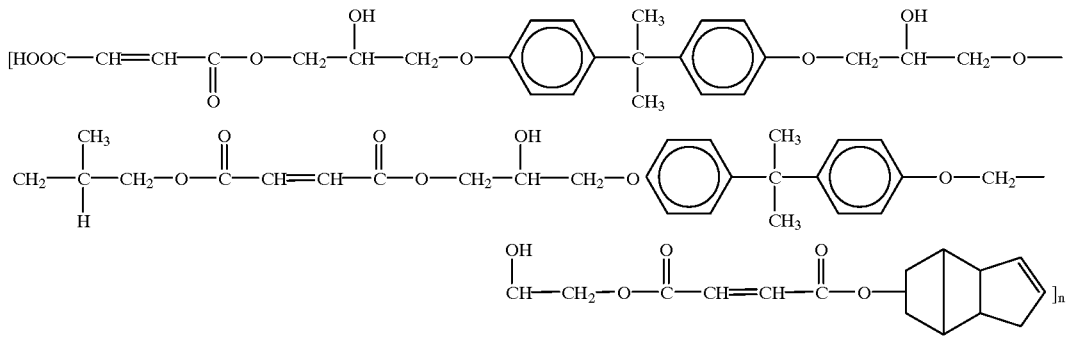

wherein n is an integer equal to or greater than one.

21. A polyester-epoxy copolymer made by reacting the following ingredients in about the following weight percents:

| Maleic Anhydride | 10–15 |
|---|---|
| H$_2$O | 1–2 |
| 98% Dicyclopentadiene | 10–15 |
| Hydroquinone (C$_6$H$_4$(OH)$_2$) | 0.1–1 |
| Methyl propanediol | 5–10 |
| Epoxy Resin | 20–35 |
| Benzoquinone | 0.004–.1 | and a sufficient amount of monomer cross-linking agent to achieve a desired viscosity.

29. A method of making a copolymer comprising:

mixing a ten carbon ester of the form:

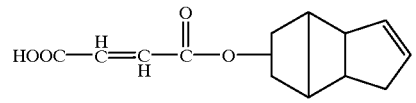

with an epoxy resin and methylpropanediol to form a mixture; and, polymerizing the mixture to form the copolymer.

30. A method of coating a surface comprising:

preparing a polyester-epoxy copolymer coating having the structure recited in claim 20;

mixing a curing catalyst with the copolymer to form a catalyst copolymer mixture; and, coating at least a portion of a surface with the catalyst copolymer mixture.

31. The method of claim 30 further comprising curing the copolymer coated on the surface.

32. A method for making a polyester-epoxy copolymer comprising:
provickling a source of unsaturation;
reacting with the source of unsaturation a source of hydroxyl to produce a modified polyester and allowing the reaction to proceed for a period of time sufficient to reach a desired acid number; and,
reacting an epoxy compound with the modified polyester for a period of time sufficient to produce a polyester/epoxy copolymer.

33. The method recited in claim 32 wherein said source of unsaturation is formed by the reaction of maleic acid with dicyclopentadiene.

34. The method recited in claim 32 wherein the source of hydroxyl is glycol.

35. The method recited in claim 32 wherein the source of hydroxyl is selected from the group consisting of an alcohol, a glycol, methyl propanediol, 1,6 hexanediol, cyclohexane dimethanol and combinations thereof.

36. The method recited in claim 32 wherein the source of unsaturation is selected from the group consisting of maleic acid, maleic anhydride, fumaric acid, methyl tetrahydro phthalic acid, tetrahydrophthalic acid, methyl nadic anhydride, nadic anhydride and excess ten carbon ester.

37. The method recited in claim 32 further comprising diluting the polyester-epoxy copolymer with a monomer cross-linking agent.

38. The method recited in claim 37 wherein said cross-linking agent is selected from the group consisting of vinyl toluene, styrene, DAP and ethoxylated allyl alcohol.

39. The method recited in claim 37 further comprising reacting an acid functional monomer with the unsaturated polyester when the source of hydroxyl is added.

40. The method recited in claim 39 wherein the acid functional monomer is a monoacid or a diacid.

41. The method recited in claim 39 wherein the acid functional monomer is selected from the group consisting of adipic acids, fatty acids, dimer acids and stearic acid.

42. The method recited in claim 34 wherein the epoxy compound is formed from one selected from the group consisting of Bisphenol A, Bisphenol F, Bisphenol S, polyglycol, epoxidized oils, polybutadiene, epoxy novalaks, modified epoxies, rubber modified epoxies and combinations thereof.

* * * * *

UNITED STATES PATENT AND TRADEMARK OFFICE
CERTIFICATE OF CORRECTION

PATENT NO. : 6,127,490
DATED : October 3, 2000
INVENTOR(S) : Albert Chris Fazio

It is certified that error appears in the above-identified patent and that said Letters Patent is hereby corrected as shown below:

On the cover sheet, under the section entitled "U.S. PATENT DOCUMENTS", delete "4,990,597" and substitute therefor --4,990,567--;

In column 7, line 21, delete "Copolomer" and substitute therefor --Copolymer--; and In column 8, lines 58-59, delete "2520 C.)" and substitute therefor --25 °C)--.

Signed and Sealed this

Twenty-ninth Day of May, 2001

*Attest:*

NICHOLAS P. GODICI

*Attesting Officer*    *Acting Director of the United States Patent and Trademark Office*